United States Patent
Schneider et al.

(10) Patent No.: US 9,123,999 B2
(45) Date of Patent: Sep. 1, 2015

(54) IMAGING SYSTEM

(75) Inventors: Martin Schneider, Hergenrath (BE);
Michael Crowley, Greenfort (IE);
Brendan Lyons, Ovens (IE); David O'Driscoll, Ballinlough (IE);
Klaus-Michael Hussmann, Aachen (DE)

(73) Assignees: SMITHS DETECTION IRELAND LIMITED, Ballincollig (IE); MSC VERTRIEBS GMBH, Stutensee (DE)

( * ) Notice: Subject to any disclaimer, the term of this patent is extended or adjusted under 35 U.S.C. 154(b) by 527 days.

(21) Appl. No.: 13/521,932

(22) PCT Filed: Jan. 14, 2011

(86) PCT No.: PCT/IE2011/000003
§ 371 (c)(1),
(2), (4) Date: Feb. 6, 2013

(87) PCT Pub. No.: WO2011/086543
PCT Pub. Date: Jul. 21, 2011

(65) Prior Publication Data
US 2013/0127667 A1    May 23, 2013

(30) Foreign Application Priority Data
Jan. 15, 2010   (IE) .................................. 2010/0023

(51) Int. Cl.
*H01Q 3/46*    (2006.01)
*G01S 13/89*   (2006.01)
*H01Q 3/24*    (2006.01)
*G01V 8/00*    (2006.01)

(52) U.S. Cl.
CPC *H01Q 3/46* (2013.01); *G01S 13/89* (2013.01); *H01Q 3/247* (2013.01); *G01V 8/005* (2013.01)

(58) Field of Classification Search
CPC .................................. G01S 13/89; H01Q 3/46
USPC .......................................................... 342/179
See application file for complete search history.

(56) References Cited

U.S. PATENT DOCUMENTS

| | | | |
|---|---|---|---|
| 5,130,717 A * | 7/1992 | Ewen et al. | 342/375 |
| 6,390,579 B1 * | 5/2002 | Roylance et al. | 347/9 |
| 6,965,340 B1 | 11/2005 | Baharav et al. | |
| 7,112,775 B2 * | 9/2006 | Lee et al. | 250/208.1 |
| 7,183,963 B2 * | 2/2007 | Lee et al. | 342/22 |
| 7,283,085 B2 * | 10/2007 | Lee et al. | 342/6 |
| 7,298,318 B2 * | 11/2007 | Baharav et al. | 342/179 |
| 7,327,304 B2 * | 2/2008 | Baharav et al. | 342/22 |
| 7,333,055 B2 * | 2/2008 | Baharav et al. | 342/376 |
| 7,394,424 B1 * | 7/2008 | Jelinek et al. | 342/375 |
| 7,504,993 B2 * | 3/2009 | Young et al. | 342/179 |
| 7,710,326 B2 | 5/2010 | Lee | |
| 8,090,052 B2 * | 1/2012 | Elmala et al. | 375/299 |
| 8,289,199 B2 * | 10/2012 | Baharav et al. | 342/6 |
| 2005/0093733 A1 | 5/2005 | Lovberg et al. | |

(Continued)

FOREIGN PATENT DOCUMENTS

| | | |
|---|---|---|
| WO | 2005017559 | 2/2005 |
| WO | 2010001377 | 1/2010 |
| WO | 2010143174 | 12/2010 |

*Primary Examiner* — Matthew M Barker
(74) *Attorney, Agent, or Firm* — Casimir Jones S.C.

(57) ABSTRACT

The invention relates to an imaging system having a reflect array for reflection of radiation such as millimeter-wave radiation. It can apply to imaging systems which operate over a wide range of wavelengths.

14 Claims, 4 Drawing Sheets

(56) References Cited

U.S. PATENT DOCUMENTS

| | | |
|---|---|---|
| 2006/0109174 A1 | 5/2006 | Baharav et al. |
| 2006/0214832 A1 | 9/2006 | Lee et al. |
| 2006/0214833 A1 | 9/2006 | Baharav et al. |
| 2007/0013575 A1 | 1/2007 | Lee et al. |
| 2007/0139248 A1* | 6/2007 | Baharav et al. .................. 342/22 |
| 2007/0139249 A1* | 6/2007 | Baharav et al. .................. 342/22 |
| 2008/0079625 A1* | 4/2008 | Weems et al. .................... 342/22 |
| 2011/0018756 A1* | 1/2011 | Wise et al. .................. 342/25 A |

\* cited by examiner

IMAGING SYSTEM

The present application is a §371 U.S. National entry of International Patent Application PCT/IE2011/000003, filed Jan. 14, 2011, with is incorporated herein by reference, and which claims priority to Irish Patent Application Serial Number 2010/0023, filed Jan. 15, 2010.

FIELD OF THE INVENTION

The invention relates to an imaging system having a reflect array for reflection of radiation such as millimeter-wave radiation. It can apply to imaging systems which operate over a wide range of wavelengths.

BACKGROUND

Inspection of people for weapons and contraband at security checkpoints has become more common in recent years. Systems using non-ionizing radiation have been developed for such inspection. In such systems there is electronic control of an array of antennas to focus millimeter wave energy on a desired spot. The resultant reflection is collected from this focus point and processed to produce a display pixel. The focus point can be scanned across a three-dimensional volume in order to provide an image display of what is contained in the volume.

For example, WO2005017559 describes a millimeter wave scanning antenna for collecting frequency-dependent beams of millimeter wave radiation from a narrow one-dimensional field of view. The collected radiation is amplified at the collected frequencies. U.S. Pat. No. 6,965,340, US2006214833, and US2006214832 describe use of an array of antenna elements which are programmable with a phase delay. US2006214834 describes use of two phase shifts 180° apart with minimization of noise. US2007013575 in which sidelobes are suppressed. U.S. Pat. No. 7,710,326 describes an array for such systems, in which there is an active device for two antenna elements. US20050093733 describes a hybrid system with a metal detector and a millimeter wave imaging system.

In many known millimeter wave imaging systems the switching of the focus point is implemented by changing control signals to the antenna array, in which one control signal to each antenna changes the antenna phase shift between 0° and 180°. The switching of the control signal results in the creation of unwanted electromagnetic radiation, particularly where there is high-speed switching and a large number of antennas, of the order of for example forty thousand). This radiation is quite significant when the entire antenna array is taken into account.

The invention is directed towards reducing the electromagnetic radiation across the antenna array whilst maintaining the image quality.

SUMMARY OF THE INVENTION

According to the invention, there is provided an imaging system comprising:
 a radiation transmitter,
 a radiation receiver,
 a reflect array comprising an array of antennas;
 a controller for providing switching control signals to the antenna array,
 wherein the controller is adapted to adjust spectral content of the antenna switching control signals.

In one embodiment, the controller is adapted to reduce power of the antenna switching control signals at a fundamental frequency.

In one embodiment, the controller is adapted to reduce power at the fundamental frequency and at harmonics of the fundamental frequency.

In one embodiment, the controller comprises clock spreading circuits for providing as a control signal presentation clock a plurality of modified versions of a master clock.

In one embodiment, the spreading circuits are adapted to provide phase-shifted versions of the master clock.

In one embodiment, the modified versions are delayed with respect to each other.

In one embodiment, the spreading circuits include taps on a master clock delay line and a multiplexer adapted to switch modified versions of a master clock onto a presentation clock line in a sequence such that a presentation clock comprises different phases of the master clock.

In one embodiment, the multiplexer is adapted to move up a delay line, selecting a tap for one cycle followed by a next tap for the next cycle and incrementing a tap index by one each time to reach a final tap, and the period of the presentation clock during each period is the fundamental period, plus the length of a tap; and the multiplexer is adapted to select in reverse by moving down the tap delay line so that the presentation clock period is the fundamental period minus the length of a tap.

In one embodiment, the controller is adapted to programmably adjust spectral content of the antenna control signals.

In one embodiment, wherein the controller is adapted to randomly or pseudo randomly present different phases of a master clock.

In one embodiment, the controller is adapted to adjust spreading frequencies and dwell times according to parameters.

In one embodiment, the controller is adapted to use different sequences on a tap delay line and to switch between different tap elements without always using a neighbouring tap to generate varying spread periods and hence varying spread frequencies.

In one embodiment, the controller comprises a plurality of spreading circuits, at least two of which operate differently when generating presentation clocks so that there is spreading across different spreading circuits.

In one embodiment, the maximum spread across presentation clocks is up to +/−5 MHz from the fundamental frequency where the fundamental frequency is in the range of 10 MHz to 70 MHz.

In one embodiment, the fundamental frequency is approximately 40 MHz and the maximum spread in +/−3 MHz.

In one embodiment, the radiation transmitter is adapted to transmit radiation in the microwave range.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

The present application provides an apparatus and method for imaging a volume for purposes of security, in which antennas are controlled with less generation of electromagnetic radiation.

Unless explicitly stated otherwise, "and" can mean "or" and "or" can mean "and". For example if a feature is described as having A, B, or C the feature can have A, B, and C, or any combination of A, B, and C. Similarly, if a feature is described as having A, B, and C, the feature can have only one or two of A, B, or C. Also, "a" and "an" can mean "one or more than". For example, if a device is described as having a feature X, the device may have one or more of feature X.

An imaging system (1) comprises an antenna array (2), 24 GHz transceivers (3), and a digital receiver (4) including an ADC and circuits for filtering. The digital receives commands from the host PC (5) and passes data to the host PC (5) for display. The host PC 5 initiates volume scans, performs system diagnostics and error reporting, and collects scan data and displays it for the operator. The digital receiver (4) presents the scan requests to the antenna array (2) in a synchronised manner. All control signals in the antenna array are presented via a presentation clock (an individual presentation clock being generated for sub-sections of the array; of the order of five hundred presentation clocks are generated). The spectral content of each presentation clock is adjusted via a spreading circuit, thus adjusting the spectral interference radiated through the printed circuit board traces to the FET elements that each presentation clock feeds. The spreading clock generation circuit include taps (Tap 1, Tap 2 . . . Tap N) on a delay line, feeding a multiplexer. Delayed versions of the master clock are switched onto the presentation clock in a given sequence such that the presentation clock is composed of different phases of the master clock. This alters the spectral content of the presentation clocks with respect to the master clock, lowering the power at the fundamental frequency. This in turn lowers the power at the harmonics of the fundamental, reducing the electromagnetic radiation across the spectrum. The presentation clocks may be offset in their spreading pattern and hence in their presentation frequency such that the electromagnetic radiation is further reduced.

Figure 1:
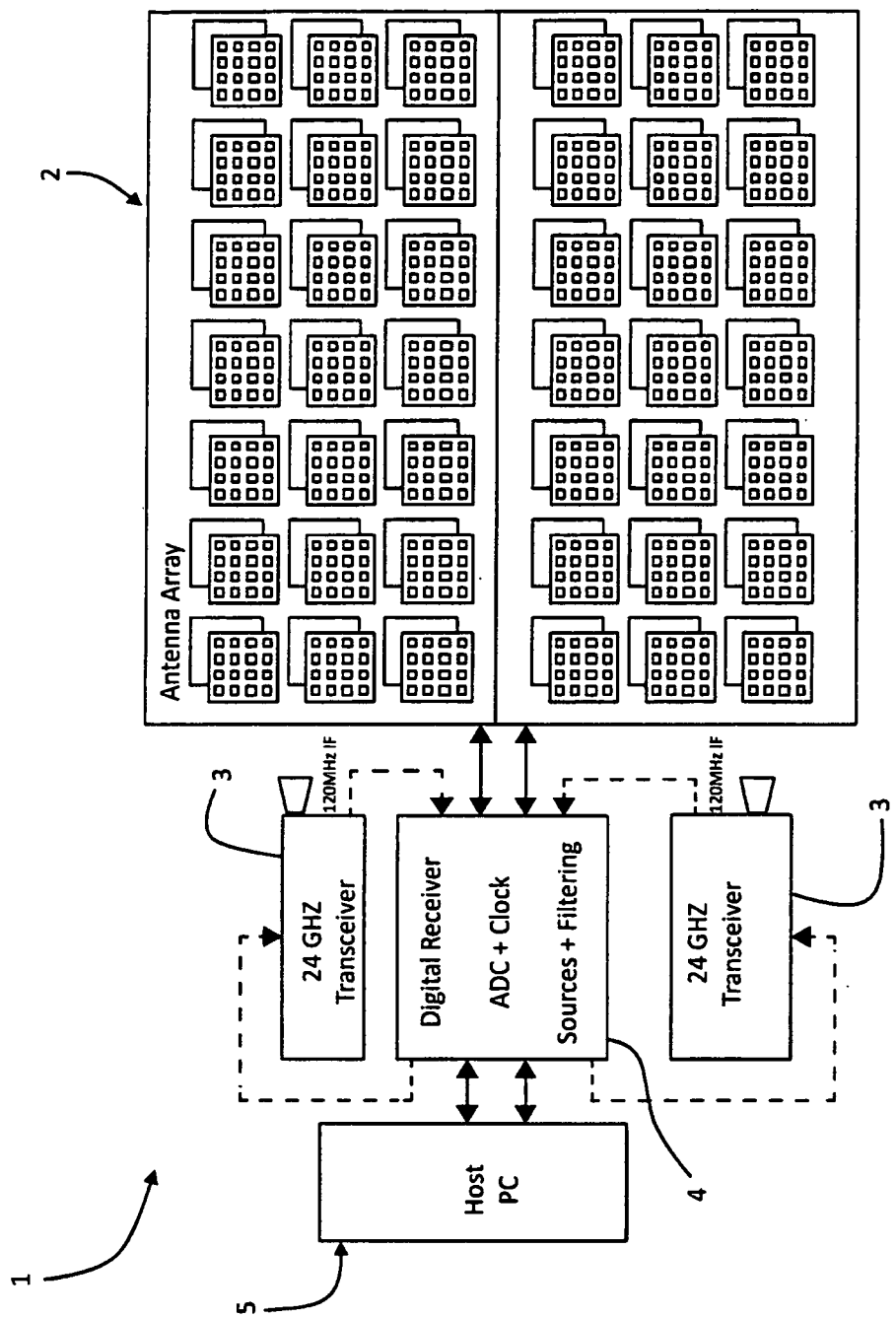
FIG. 1 is a diagram of the main components of an imaging system of the invention.

Referring to FIG. 1 an imaging system 1 comprises an antenna array 2, 24 GHz transceivers 3, and a digital receiver 4 including an ADC and circuits for filtering. The digital receiver communicates with a host PC 5 which is part of the system. The digital receiver receives commands from the host PC and passes data to the host PC for display.

The host PC 5 presents a GUI to the operator, initiates volume scans by issuing "scan requests", performs system diagnostics and error reporting, and collects scan data and displays it for the operator. The digital receiver 4 receives the scan requests from the host PC 5 and presents them to the antenna array 2 in a synchronised manner. Also, it receives and packetises scan data from the transceivers 3, and passes it to the host PC 5 for processing and display. Each transceiver 3 transmits high-frequency energy from RF horn(s) "at" the antenna array 2, and it collects high-frequency energy from the antenna array 2 (reflected from the target), down-converts it to a lower frequency and passes it to the digital receiver 4 for processing and packetization.

Figure 2:
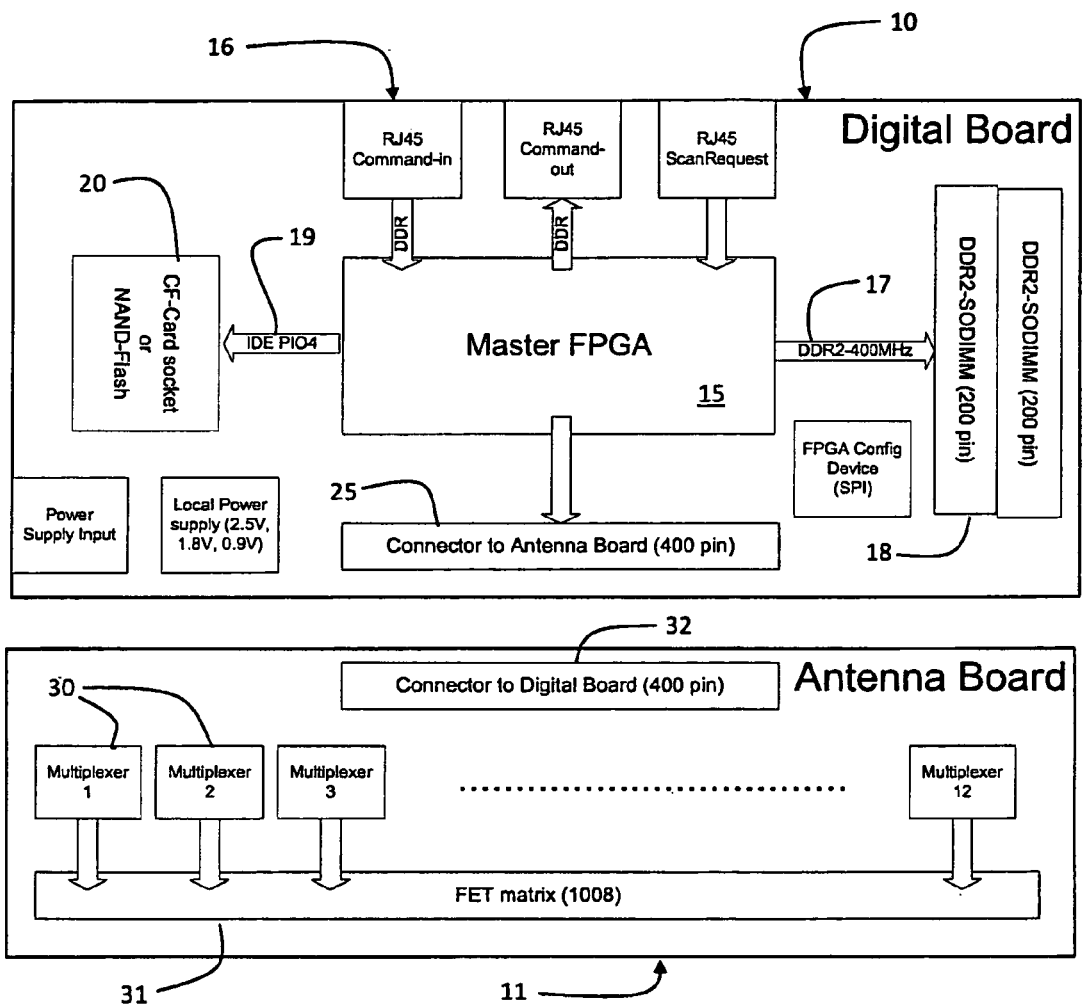
FIG. 2 is a more detailed block diagram illustrating an antenna tile board circuit.

Referring to FIG. 2, the antenna array 2 comprises a multiple of "tile" boards composed of a digital tile board 10, each linked with an antenna board 11. A master FPGA 15 is linked with RJ45 interfaces 16 for communication with the digital receiver 4. There is also a DDR2 400 MHz interface 17 to DDR2-SODIMM memory circuits 18, and an IDE interface 19 to a CF Card socket 20 or NAND Flash. There is a 400-pin connector 25 to the antenna board 11.

The antenna board 11 comprises twelve multiplexers 30 on an FET matrix 31 with 1008 elements, and communication with the digital board is via a 400-pin connector 32.

The multiplexers are implemented using programmable logic chips; their function being to supply the FET matrix 31 with the control signals necessary to focus the antenna array. It is the switching of these control signals that causes the unwanted electromagnetic radiation and so it is on these control lines that radiation mitigation techniques are desired.

Figure 3:
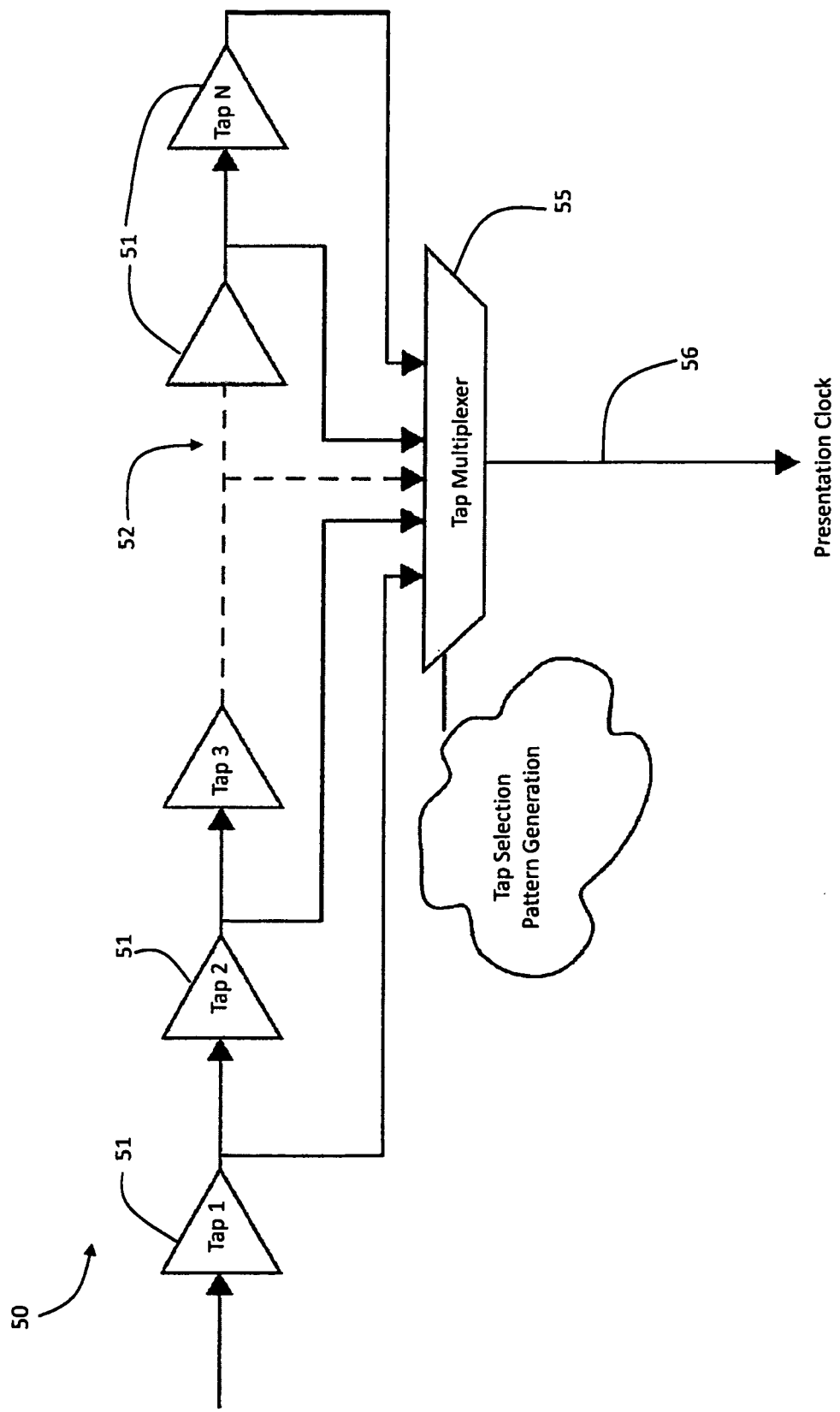
FIG. 3 is a diagram illustrating part of a clock spreading circuit.

All control signals are presented via a presentation clock (an individual presentation clock is generated within each particular multiplexer 30). The spectral content of this presentation clock is adjusted by a spreading circuit 50 shown in FIG. 3. The spreading circuit 50 adjusts the spectral interference radiated from the routing on the printed circuit boards to the FET elements that the multiplexer feeds. The clock spreading circuits 50 adjust the spectral content of the control signals to the antenna array in such a way that the electromagnetic radiation is lowered to within acceptable levels. Referring to FIG. 3 each spreading circuit 50 includes taps 51, Tap 1, Tap 2 . . . Tap N, on a delay line 52 and feeding a multiplexer 55. The tap delay line 52 is used to create a number of delayed versions of the master clock. These delayed versions of the master clock are switched onto a presentation clock line 56 in a given sequence such that the presentation clock is composed of different phases of the master clock. This alters the spectral content of the presentation clocks with respect to the master clock, lowering the power at the fundamental frequency. This in turn lowers the power at the harmonics of the fundamental, reducing the electromagnetic radiation across the spectrum.

Figure 4:
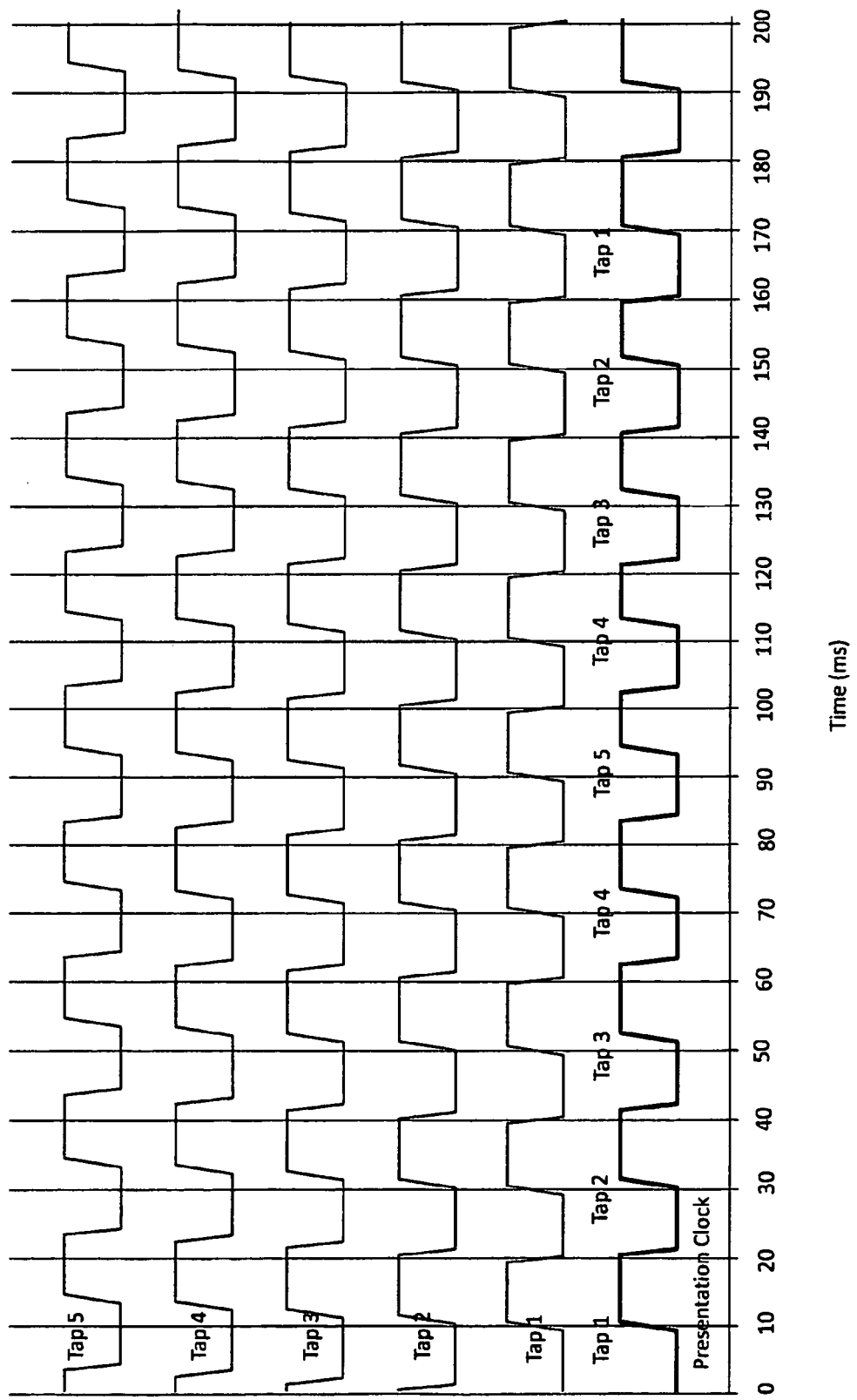
FIG. 4 is a diagram illustrating clock spreading circuit operation.

A time-domain example of some tap clocks and a multiplexed presentation clock is shown in FIG. 4. In this example, for simplicity, only five taps are used in the tap delay line. The sequence used in this example is that the clock multiplexer first moves up the delay line, selecting Tap 1 for one cycle followed by Tap 2 for the next cycle and incrementing the tap index by one each time to reach Tap 5. The period of the clock during this period is the fundamental period (the period of the original clock) plus the length of a tap.

$$T_{period} = T_{fundamental} + T_{tap}$$

The reverse is then done i.e. the clock multiplexer 55 moves down the tap delay line from Tap 5 down to Tap 1. The period of the clock during this period is the fundamental period (the period of the original clock) minus the length of a tap.

$$T_{period} = T_{fundamental} - T_{tap}$$

Using different sequences on the tap delay line and switching between different tap elements (the neighbouring tap does not always need to be used) a large number of frequencies can be generated with varying dwell times at each frequency. The dwell time at a particular frequency is limited by the length of the tap delay line. The spreading effect can also be increased by using different lengths for each tap delay element thus ensuring a spread across a number of different frequencies.

The manner of spreading is such as not to adversely affect the image quality. In a simple example, the frequency might be 39.9 MHz for a short period and for a later short period it is 40.1 MHz. This is a significant spread across specific frequencies to achieve spreading of power over an acceptable band. The preferred maximum spread across presentation clocks can be up to +/−3 MHz from the fundamental frequency.

It should be noted that the presentation clocks at each individual multiplexer can also be offset from each other in their multiplexer pattern cycle such that at any one time the spectral contribution of the various distributed presentation clocks and the associated control signals can be varied.

Some options exist in the tap delay line control algorithm:
(a) A programmable multiplexer pattern can be used which can be adjusted based on system parameters/system hardware to produce the best electromagnetic radiation suppression for a particular system configuration.
(b) A fixed pseudo-random repetitive multiplexer pattern can be used which pseudo-randomly presents different phases and hence different frequency offsets and hence randomly adjusts the spectral content in time.
(c) A fixed multiplexer pattern can be used which is optimised for a certain system configuration.

In another embodiment, a spread spectrum clock generator (SSCG) was used to spread the master clock to the antenna array. The results from an electromagnetic radiation perspective proved positive however the image quality was degraded. This appears to arise from the low modulation rate of SSCGs i.e. the output clock remains at offset frequencies from the input clock for a long period of time. This is a requirement for SSCGs:
To allow the spread clock to be passed to PLLs without unlocking the PLLs
To allow the maximum electromagnetic suppression The effect of this low modulation rate was to cause an increasing phase error on the presentation clock with respect to the antenna array master clock. This embodiment was not therefore optimal.

The advantages of the embodiments (a), (b), and (c) with respect to SSCG approach are:
The use of programmable logic to implement the delay allowed for the phase error on the presentation clock to be optimised such that the image quality was not impaired.
The use of a delay line in programmable logic allowed experimentation with the delay multiplexer patterns which in turn allowed for an optimised electromagnetic suppression.

The invention is not limited to the embodiments described but may be varied in construction and detail.

The invention claimed is:

1. An imaging system comprising:
a radiation transmitter,
a radiation receiver,
a reflect array comprising an array of antennas;
a controller configured to provide switching control signals to the antenna array to focus the antenna array,
wherein the controller both:
(a) is configured to adjust spectral content of the antenna switching control signals; and
(b) comprises clock spreading circuits configured to provide as a control signal presentation clock a plurality of delayed versions of a master clock.

2. An imaging system as claimed in any of claim 1, wherein the controller is configured to reduce power of the presentation clock at a fundamental frequency and at harmonics of the fundamental frequency, with respect to power of the master clock.

3. An imaging system as claimed in claim 1, wherein the spreading circuits are configured to provide phase-shifted versions of the master clock.

4. An imaging system as claimed in claim 3, wherein the modified versions are delayed with respect to each other.

5. An imaging system as claimed in claim 3, wherein the spreading circuits include taps on a master clock delay line and a multiplexer configured to switch modified versions of a master clock onto a presentation clock line in a sequence such that a presentation clock comprises different phases of the master clock.

6. An imaging system as claimed in claim 5, wherein the multiplexer is configured to move up a delay line, selecting a tap for one cycle followed by a next tap for the next cycle and incrementing a tap index by one each time to reach a final tap, and the period of the presentation clock during each period is the fundamental period, plus the length of a tap; and the multiplexer is configured to select in reverse by moving down the tap delay line so that the presentation clock period is the fundamental period minus the length of a tap.

7. An imaging system as claimed in any of claim 6, wherein the controller is configured to use different sequences on a tap delay line and to switch between different tap elements without always using a neighbouring tap to generate varying spread periods and hence varying spread frequencies.

8. An imaging system as claimed in claim 1, wherein the controller is configured to programmably adjust spectral content of the antenna control signals.

9. An imaging system as claimed in claim 8, wherein the controller is configured to randomly or pseudo randomly present different phases of a master clock.

10. An imaging system as claimed in claim 8, wherein the controller is configured to adjust spreading frequencies and dwell times according to parameters.

11. An imaging system as claimed in claim 1, wherein the controller comprises a plurality of spreading circuits, at least two of which operate differently when generating presentation clocks so that there is spreading across different spreading circuits.

12. An imaging system as claimed in claim 1, wherein a maximum spread across presentation clocks is up to +/−5 MHz from a fundamental frequency where the fundamental frequency is in the range of 10 MHz to 70 MHz.

13. An imaging system as claimed in claim 12, wherein the fundamental frequency is approximately 40 MHz and the maximum spread in +/−3 MHz.

14. An imaging system as claimed in claim 1, wherein the radiation transmitter is configured to transmit radiation in the microwave range.

* * * * *